Henry M. Hunter
Robert W. Bussard
INVENTOR.

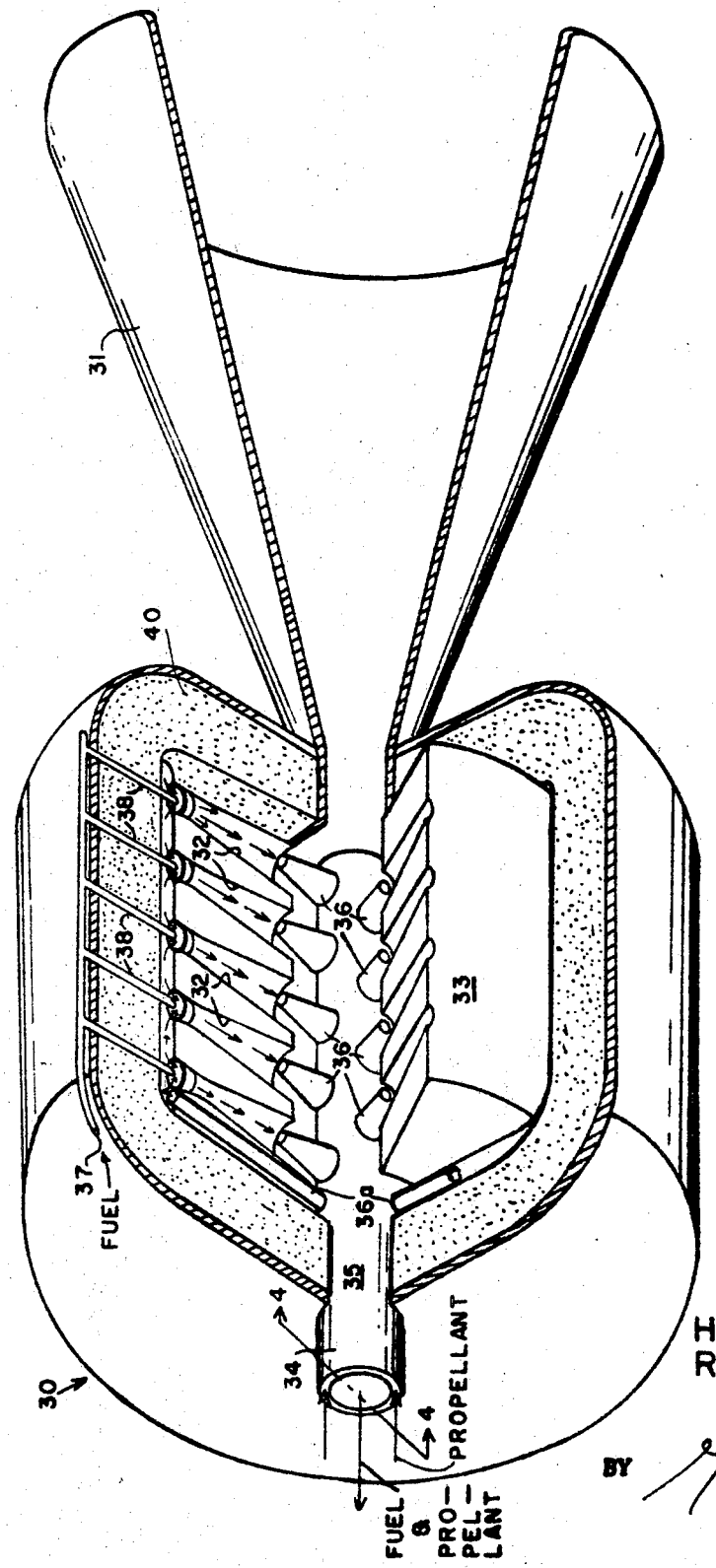

United States Patent Office 3,399,534
Patented Sept. 3, 1968

3,399,534
GAS CORE REACTOR PROPULSION SYSTEM
Henry M. Hunter, Palos Verdes Peninsula, and Robert W. Bussard, Palos Verdes Estates, Calif., assignors to TRW Inc., Redondo Beach, Calif., a corporation of Ohio
Filed July 14, 1965, Ser. No. 472,404
10 Claims. (Cl. 60—203)

ABSTRACT OF THE DISCLOSURE

An intergalactic propulsion system utilizing a gas core reactor to preheat the propellant before being expelled through a suitable nozzle. Mixing of the propellant fuel and the fissioning gas core is prevented by causing the propellant fuel to be discharged into the reactor chamber in a parallel coaxial stream about the fissioning gas fuel at substantially constant pressure and substantially constant axial velocity along the reactor length, the fissioning gas fuel being separate and recycled, whereas the heated propellant gas is expelled as thrust through the nozzle.

---

This invention relates to a gas core reactor propulsion system and more particularly to a unique and improved system in which the difficult process of fuel retention is accomplished by capturing, condensing and separating the fuel from the propellant outside of the fissioning cavity.

In the prior art devices, large amounts of the gaseous fuel mixes with the gas propellant which is then expended outside the vehicle and lost to the system. It is well known that for extended missions, for example to the moon or other planets, that fuel conservation is extremely important. It is quite important, therefore that reactor fuel not be expended with the gas propellant outside the vehicle, but rather be conserved and burned as a fuel independently of the gas propellant. This invention proposes techniques that allow sufficient heat transfer by radiation from the fissioning gas fuel to the gas propellant without substantial mixing.

In this invention, there is proposed a gas core reactor having a fissioning gas fuel flowing at substantially constant pressure and substantially constant axial velocity along the reactor length. A source of propellant gas is discharged into the reactor chamber in a parallel coaxial stream about the fissioning gas fuel. Shear velocities responsible for fuel propellant mixing in other flow concepts are thereby minimized in this design. At reactor discharge, the gas fuel is collected and cooled to an acceptable temperature preferably by being mixed with the incoming cold gas propellant and then separated outside the reactor core. Separation is accomplished by condensation of the fuel thereby exploiting the liquid gas phase difference between the liquid fuel and the gas propellant. Once separated, the fuel is recycled through the reactor. The stored propellant is used to condense the fuel and to cool the reactor structure where it is then collected and passed through the reactor, where it is heated further by thermal radiation as it flows coaxially with the fissioning gas fuel stream. The gas propellant is then discharged through an exit nozzle to provide thrust.

Further objectives and advantages of the present invention will be made more apparent by referring now to the accompanying drawings where:

FIGURE 3 illustrates a second embodiment of the invention in the form of a radial gas core reactor propulsion system having a plurality of individual radial flow cells.

Figure 1:
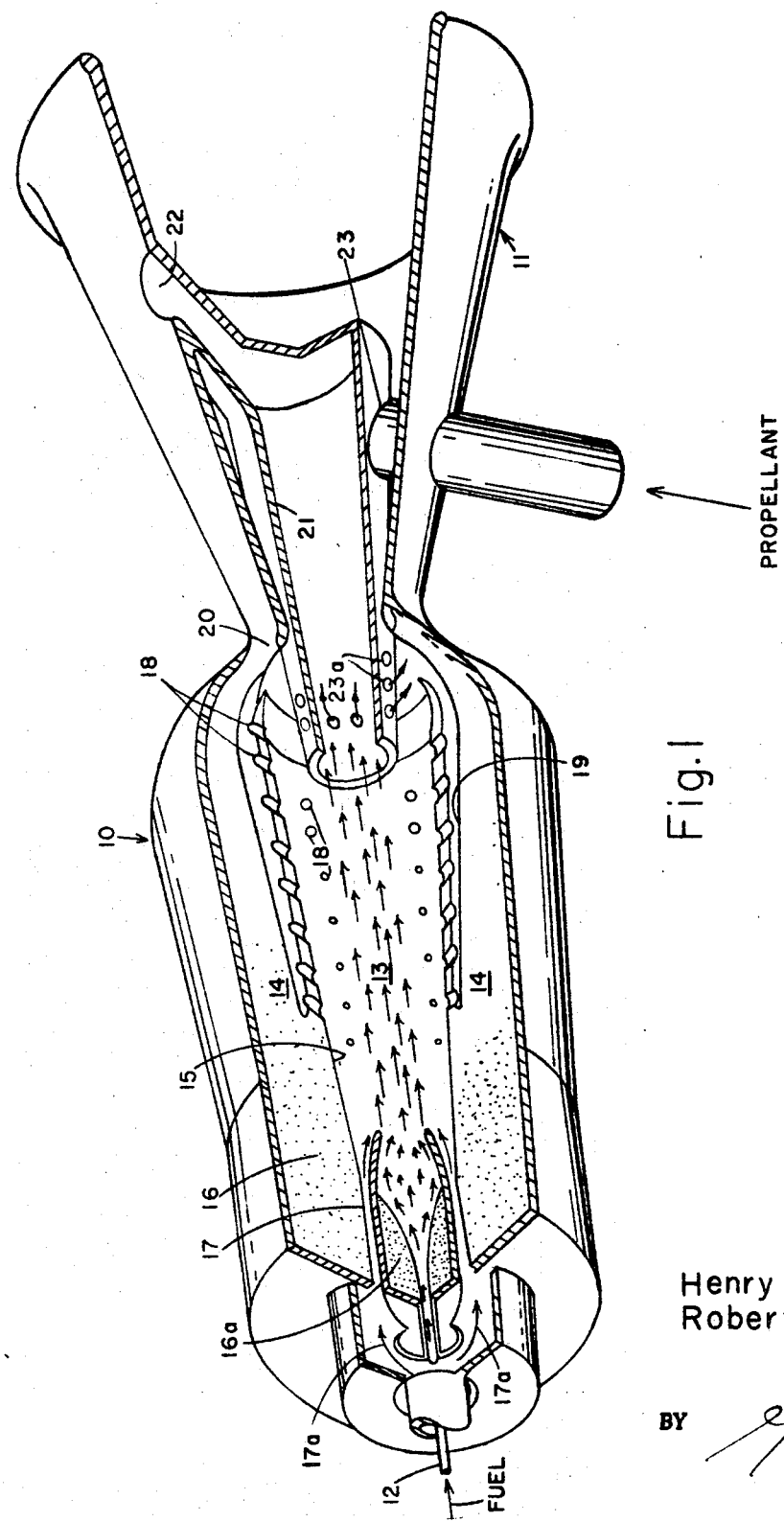
FIGURE 1 is a cutaway view of a single cylindrical cavity gas core reactor propulsion system.

Referring now to FIGURE 1, there is shown a single cylindrical cavity gas core reactor propulsion system comprising a gas core reactor 10 coupled at one end to a discharge port or nozzle 11. The reactor 10 is basically cylindrical in shape in which the liquid fuel, for example plutonium ($Pu^{239}$) or uranium ($U^{235}$), is injected into the free end of the reactor through a suitable fuel inlet 12. The liquid fuel is injected into the gas core reactor 10 along the axis thereof at a suitable pressure to maintain a flow 13 of the fissioning gas along the length of the reactor. A moderator reflector 14 completely surrounds the flow of fuel 13 to thereby define a cavity 15 for the propellant flow. Fissioning is accomplished by having a moderator reflector as at 16 and at 16a at that portion of the reactor 10 where the liquid fuel is first injected into the cavity 15.

The propellant gas, for example, hydrogen, is fed coaxially with the liquid fuel at inlet 12 but separate from the liquid fuel. The propellant gas is caused to flow through an annular ring 17 as shown by arrows 17a at the input opening of the reactor 10 so as to flow coaxially with the liquid fuel being injected into the cavity.

The benefits claimed and achieved by the foregoing design depend primarily on the parallel coaxial stream of propellant gas and fissioning fuel within the cavity 15, in which mixing of the gases is minimized by maintaining a constant pressure and a near constant axial velocity of both gases along the reactor length. Shear velocities primarily responsible for mixing of the gas propellant and gas fuel are minimized, thus removing the primary cause of fuel contamination. In the case of maintaining constant velocities and pressures across the stream boundaries of the propellant gas and the fissioning gas fuel, it is apparent that heating of the propellant gas requires an expansion of the cavity 15 towards the discharge end of the reactor to provide for the expanding propellant gas. In order to maintain a fissioning gas within the cavity of the reactor 10, it is necessary that neutrons leaving the fissioning fuel stream have a high probability of being reflected back to the fuel stream on being reflected off the walls of the moderator reflector 14. In other words, the ratio of the cavity radius to the fuel radius of the fissioning gas must be kept to a low value. The propellant gas, as it flows along the reactor with the fissioning gas 13, is heated and expands. In the case when the axial velocity is to remain nearly constant, then radial expansion of the propellant gas is provided for in the form of a plurality of bleeder holes 18 located in the periphery of the moderator reflector 14 near the discharge portion of the reactor 10. The holes 18 form a bypass to allow the expanding propellant gas into an additional cavity 19 formed within the moderator reflector 14. The gas accumulating within the cavity 19 is discharged through the nozzle 11 in the normal manner. The amount of propellant gas that bypasses through the holes 18 is sufficient to allow a near constant velocity and pressure across the stream boundaries between the gas fuel and the propellant gas. The main propellant gas being heated and the bypassed propellant gas are both combined and discharged through the nozzle 11. The nozzle 11 is connected to the reactor 10 at a restricted opening forming a throat 20.

The fissioning gas fuel 13 is collected by a hollow double-walled scoop 21 having an opening at one end to accept the gas fuel and is centrally supported within the throat 20 at the nozzle 11. The scoop 21 is supported, for example, by three or more hollow supporting brackets of which only bracket 22 is illustrated. Bracket 22 is hollow and thus forms a channel for the discharge of fluids collected by scoop 21. The scoop is arranged to collect fissioning gas fuel 13 and cold propellant which flows from inlet 23 through the double wall of the scoop and which is injected into the scoop by way of holes 23a. Introduction of the cold propellant serves to cool the hot plasma gas entering the scoop 21 to an acceptable handling temperature before being collected and discharged through the opening in bracket 22. By introducing the cold propellant at high speeds along the periphery of the scoop 21, there is achieved, by virtue of the high momentum of the propellant gas, an increase in the low momentum of the gas fuel uranium stream. This interchange of momentum results in a net increase in uranium stream pressure. The output from bracket 22 comprising the combined liquid fuel and gas propellant is discharged to a separator.

As shown in FIGURE 1 the cold propellant gas fed through the inlet contained in channel 23 is channeled within and along the double wall periphery of the scoop 21 and allowed to exhaust primarily from that portion of the scoop facing the gas fuel 13 through holes 23a. The scoop 21 is preferably constructed of a porous material to permit transpiration cooling of both the inner and outer surfaces of the scoop. It is considered most desirable that all scoop structures consist of a tubular structure welded together to form the scoop contour of inner and outside walls which should be of porous material to permit transpiration cooling. The gas fuel uranium stream 13 at the reactor discharge is, therefore, substantially cooled as it is introduced into the scoop 21. At reactor discharge, certain arrangements of reactors can insure sharp tail-off in the fissioning rate, thereby allowing the hot flow stream to thermally radiate its heat to the surrounding propellant gas. The reduction of core heat is assured within a few inches of mixing length when the surrounding propellant radial temperature distribution averages out to its mean value.

An alternating technique is to reduce the core temperature at the expense of specific impulse and weight/thrust of the gas core reactor engine. The reduction in propellant exit temperature, for example, from 30,000° R. to 15,000° R. for uranium may be minimized by increasing the transfer of heat from the core to the surrounding propellant gas. This increased heat transfer may be assured by increasing the effective time for heat transfer to take place, such as by increasing reactor length/diameter and reducing through-flow velocities. In addition, selected seeding of the propellant gas stream which makes only the outer boundaries of the propellant gas opaque to thermal radiation, thus permitting a higher value of mean propellant temperature to core temperature. A third alternative is to create an ablative bleeding of the scoop 21 which is continuously replenished as it is consumed.

Figure 2:
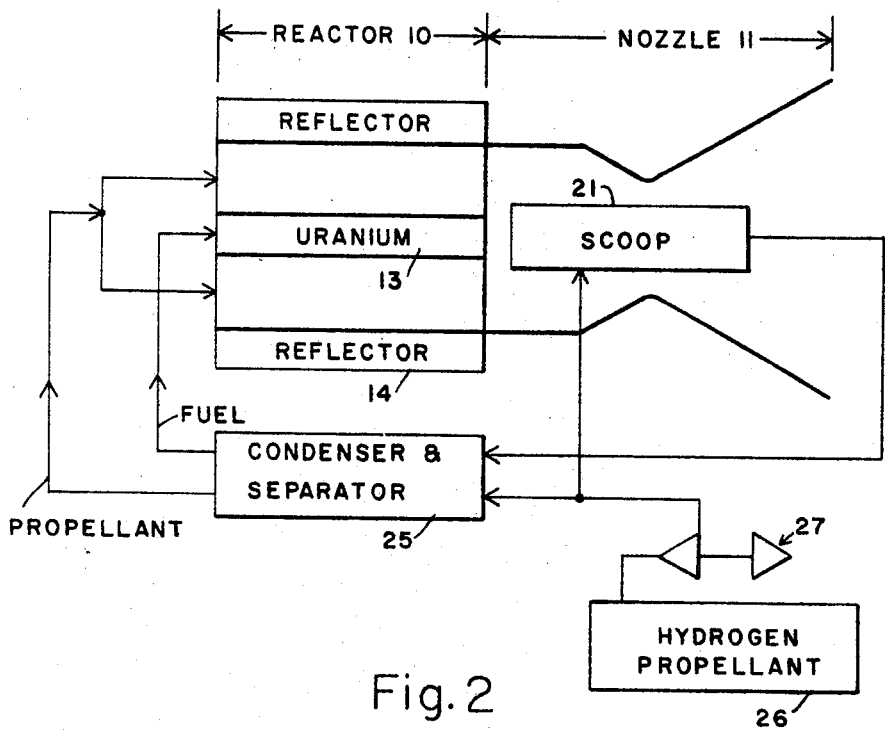
FIGURE 2 is a flow cycle block diagram for the single cell reactor propulsion system illustrated in FIGURE 1.
Figure 4:
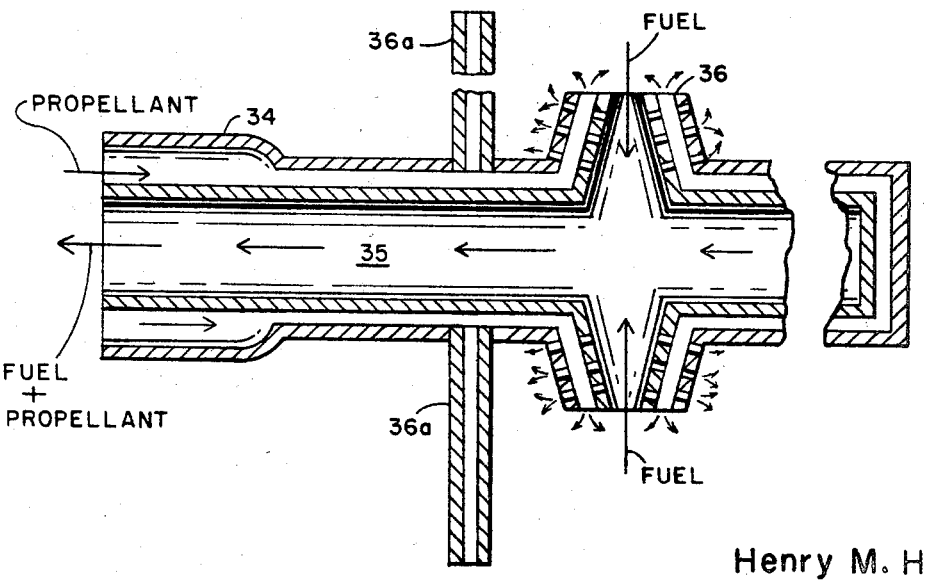
FIGURE 4 is a section taken along lines 4—4 of FIGURE 3, which more fully illustrates the operation of the scoop.

Referring now to FIGURE 2, there is shown a flow cycle block diagram for the single core propulsion system illustrated in FIGURE 1. The uranium fuel 13 is collected by the scoop 21 which cools and thereby condenses the fuel into a liquid by mixing it with a portion of the cold propellant gas. The combined liquid fuel and propellant gas is fed to a condenser and separator 25. The condenser and separator 25 separate the liquid fuel from the propellant gas and discharge the liquid fuel directly into the central core of the reactor 10 and which form the uranium fuel gas 13. The separated propellant gas from the condenser and separator 25 is fed into the cavity of the reactor 10 coaxially and at the same pressure as the fissioning reactor fuel 13. The heated propellant gas is discharged from the nozzle 11 together with that portion of the gas that is bypassed from the cavity 19. A supply of propellant fuel is contained in tank 26 and fed by pump 27, to condenser and separator 25, and to scoop 21 for cooling purposes. A supply of propellant gas may be fed through the moderator reflector 14 to cool the reactor walls before entering the reactor cavities. Propellant gas may also be fed directly into the nozzle 11 in an effort to cool the nozzle walls in the same manner as the scoop surfaces. The nozzle 11 surface is cooled regeneratively or by transpiration technique by the cold propellant ducted directly from the pump discharge.

Referring now to FIGURE 3, there is shown a radial gas core reactor propulsion system utilizing a plurality of individual fuel cells all located with a single housing and discharging into a single nozzle. The principle of operation of the multiple cell gas core is similar to that described in connection with the single gas core illustrated in FIGURE 1. As in the previous arrangement, each flow cell consists of a coaxial stream of fuel and propellant. The complete reactor is heterogeneous in geometry with several flow cells stacked radially in an annular cylindrical cell array. The spaces between the individual cavities contain the moderator whereas the overall reactor is surrounded by an external reflector moderator. The fuel and propellant flow paths are qualitatively the same in both single and multiple gas core concepts. In the multiple cell reactor, the fuel and propellant flow radially and the individual scoops collect the fuel while the propellant gas flows axially out through the nozzle as is specifically described in connection with FIG. 1. Higher efficiency is contemplated in this arrangement since better neutron utilization is achieved thereby reducing the inventory of fuel needed to attain criticality. The implementation of the multiple gas core reactor propulsion system is more fully illustrated in connection with FIGURE 3 where there is shown a section 4—4 more fully illustrating the port 34 and the channel 35. Located within the casing 30 is a plurality of cavities 32. In the embodiment illustrated, there is a total of 18 cavities 32 contained in two banks of 5 and two banks of 4. A port 34, located on the outside of reactor 30 opposite nozzle 31, is actually one end of a hollow walled cylindrical channel 35 communicating with a plurality of scoops 36, one for each cavity 32 and a pipe 36a. There are as many pipes 36a as there are cavities 32. The pipes 36a direct the propellant from the hollow walls of channel 35 to the space between the cavity-forming member 33 and the moderator reflector 40. The propellant gas is caused to flow coaxially with the fuel from each of the pipes 38 so as to be heated and eventually discharged through the nozzle 31 as described in connection with FIG. 1. Each of the scoops 36 are arranged to catch the gas fuel and return it through the central portion of channel 35 and out the central portion of the port 34. The hollow walled portion of the port 34 and the channel 35 is arranged to receive the cold propellant gas for cooling the scoop 36 by means of holes located on the periphery of the scoop. As explained in connection with FIGURES 1 and 2, the returned fuel from port 34 is in a liquid state mixed with the propellant gas. The combined liquid fuel and gas propellant is separated and recycled as mentioned previously. The cooling propellant gas is inserted into port 34 in the periphery of the walls defining cylindrical channel 35 which communicates with each of the scoops 36 as described in connection with FIGURE 2 for cooling the plasma in the scoops. Liquid fuel for the reactor is supplied from a fuel inlet line 37 located externally on the outside casing comprising the reactor frame 30 and is arranged to communicate by means of pipes 38 with each of the cavities 32. Each cavity 32 has an individual fuel inlet line which lines are preferably interconnected at some external location and fed from a single location not illustrated. The propellant gas is injected in a parallel coaxial stream with the fissioning fuel at the inlet of each cavity 32, thereby minimizing mixing of the gases by maintaining constant pressure and near constant axial velocity along the reactor length in the same manner as described in connection with FIGURE 1. The individual cavities 32 of each cell diverge as necessary to accept the expanding propellant gas. If necessary, bypass ports as illustrated in FIGURE 1, may also be used. The heated propellant gas in each core passes over the scoop 36 where it is finally discharged axially through the exit nozzle 31 to provide thrust. The fissionable fuel is kept critical in the reactor flow cavity (or flow cells) by maintaining it at a sufficiently high density and surrounding it with an efficient neutron moderator reflector 40 as described previously.

This completes the description of the embodiments of the invention illustrated herein. However, many modifications and advantages thereof will be apparent to persons skilled in the art without departing from the spirit and scope of this invention.

Accordingly, it is desired that this invention not be limited to the particular details of the embodiments disclosed herein, except as defined by the appended claims.

What is claimed is:

1. A nuclear propulsion system comprising
a gas core reactor having a fissioning gas fuel flowing at substantially constant pressure and substantially constant axial velocity along the reactor length,
means for injecting a propellant gas at substantially the same pressure and in a parallel coaxial stream about said flowing fissioning gas fuel,
said propellant gas being heated by radiation from said fissioning gas fuel whereby mixing of said propellant gas with said fissioning gas fuel is substantially minimized,
means for discharging said heated propellant gas through an exhaust port to obtain desired thrust, and
means for collecting and cooling said gas fuel to a liquid state and means for recycling the liquid fuel into said reactor.

2. A nuclear propulsion system comprising
a gas core reactor having a fissioning gas fuel flowing at substantially constant pressure and substantially constant aixal velocity along the reactor length,
means for injecting a propellant gas at substantially the same pressure and in a parallel coaxial stream about said flowing fissioning gas fuel,
said propellant gas being heated by radiation from said fissioning gas fuel whereby mixing of said propellant gas with said fissioning gas fuel is substantially minimized,
means for discharging said heated propellant gas through an exhaust port to obtain desired thrust,
means for collecing said gas fuel and said propellant gas and cooling said gas fuel to a liquid state whereby gas propellant collected remains in a gaseous state,
means for separating said liquid fuel from said gas propellant, and
means for recycling said fuel into said reactor.

3. A nuclear propulsion system comprising
a gas core reactor having a fissioning gas fuel flowing at substantially constant pressure and substantially constant axial velocity along the reactor length,
means for injecting a propellant gas at substantially the same pressure and in a parallel coaxial stream about said flowing fissioning gas fuel,
said propellant gas being heated by radiation from said fissioning gas fuel whereby mixing of said propellant gas with said fissioning gas fuel is substantially minimized,
means for discharging said heated propellant gas through an exhaust port to obtain desired thrust,
means for collecting said gas fuel and said propellant gas and cooling said gas fuel with incoming cold gas propellant to a liquid state whereby the gas propellant collected remains in a gaseous state,
means for separating said liquid fuel from said gas propellant, and
means for recycling said fuel into said reactor.

4. A nuclear propulsion system comprising
a gas core reactor having a fissioning gas fuel flowing at substantially constant pressure and substantially constant axial velocity along the reactor length,
means for injecting a propellant gas at substantially the same pressure and in a parallel coaxial stream about said flowing fissioning gas fuel,
said propellant gas being heated by radiation from said fissioning gas fuel whereby mixing of said propellant gas with said fissioning gas fuel is substantially minimized,
means for collecting said gas fuel and said propellant gas and cooling said gas fuel to a liquid state whereby gas propellant collected remains in a gaseous state,
means for separating said liquid fuel from said gas propellant,
means for recycling said fuel into said reactor, and
means for discharging said heated gas propellant and said separated gas propellant through an exhaust port to obtain desired thrust.

5. A nuclear propulsion system comprising
a gas core reactor having a fissioning gas fuel flowing at substantially constant pressure and substantially constant axial velocity along the reactor length, said reactor having a substantially constant diameter,
means for injecting a propellant gas at substantially the same pressure and in a parallel coaxial stream about said flowing fissioning gas fuel,
said propellant gas being heated by radiation from said fissioning gas fuel whereby mixing of said propellant gas with said fissioning gas fuel is substantially minimized,
means for removing a portion of the expanding heated propellant gas from the periphery of the reactor,
means for discharging said heated propellant gas through an exhaust port to obtain desired thrust, and
means for collecting and cooling said gas fuel to a liquid state and means for recycling the liquid fuel into said reactor.

6. A nuclear propulsion system comprising
a plurality of gas core reactors each having a fissioning gas fuel flowing at substantially constant pressure and substantially constant axial velocity along each core length,
each of said gas core reactors located radially with respect to each other,
means for injecting a propellant gas at substantially the same pressure and in a parallel coaxial stream about each of said flowing fissioning gas fuel,
said propellant gas being heated by radiation from said fissioning gas fuel whereby mixing of said propellant gas with said fissioning gas fuel is substantially minimized.
means for discharging said heated propellant gas through a single exhaust port to obtain thrust, and
means for collecting and cooling said gas fuel to a liquid state and means for recycling the liquid fuel into said reactor.

7. A nuclear propulsion system comprising
a plurality of gas core reactors each having a fissioning gas fuel flowing at substantially constant pressure and substantially constant axial velocity along each core length,
each of said gas core reactors located radially with respect to each other,
means for injecting a propellant gas at substantially the same pressure and in a parallel coaxial stream about each of said flowing fissioning gas fuel,
said propellant gas being heated by radiation from said fissioning gas fuel whereby mixing of said propellant gas with said fissioning gas fuel is substantially minimized.
means for discharging said heated propellant gas through a single exhaust port to obtain desired thrust,
means for collecting and cooling said gas fuel to a liquid state whereby gas propellant collected remains in a gaseous state, means for separating said liquid fuel from said gas propellant, and means for recycling said fuel into each of said reactors.

8. A nuclear propulsion system comprising
a plurality of gas core reactors each having a fissioning gas fuel flowing at substantially constant axial velocity along each core length, each of said gas core reactors located radially with respect to each other, means for injecting a propellant gas at substantially the same pressure and in a parallel coaxial stream about each of said flowing fissioning gas fuel, said propellant gas being heated by radiation from said fissioning gas fuel whereby mixing of said propellant gas with said fissioning gas fuel is substantially minimized.

means for discharging said heated propellant gas through a single exhaust port to obtain desired thrust, means for collecting and cooling said gas fuel with incoming cold gas propellant to a liquid state whereby the gas propellant collected remains in a gaseous state, means for separating said liquid fuel from said gas propellant, and means for recycling said fuel into each of said reactors.

9. A nuclear propulsion system comprising
a plurality of gas core reactors each having a fissioning gas fuel flowing at substantially constant pressure and substantially constant axial velocity along each core length, each of said gas core reactors located radially with respect to each other, means for injecting a propellant gas at substantially the same pressure and in a parallel coaxial stream about said flowing fissioning gas fuel, said propellant gas being heated by radiation from said fissioning gas fuel whereby mixing of said propellant gas with said fissioning gas fuel is substantially minimized.

means for collecting and cooling said gas fuel to a liquid state whereby gas propellant collected remains in a gaseous state, means for separating said liquid fuel from said gas propellant, means for recycling said fuel into each of said reactors, and means for discharging said heated gas propellant and said separated gas propellant through a single exhaust port to obtain desired thrust.

10. A nuclear propulsion system comprising
a plurality of gas core reactors each having a fissioning gas fuel flowing at substantially constant pressure and substantially constant axial velocity along each core length, each of said reactors having a substantially constant diameter, each of said gas core reactors located radially with respect to each other, means for injecting a propellant gas at substantially the same pressure and in a parallel coaxial stream about each of said flowing fissioning gas fuel, said propellant gas being heated by radiation from said fissioning gas fuel whereby mixing of said propellant gas with said fissioning gas fuel is substantially minimized.

means for removing a portion of the expanding heated propellant gas from the periphery of the reactor, means for discharging said heated propellant gas through a single exhaust port to obtain desired thrust, and means for collecting and cooling said gas fuel to a liquid state and means for recycling the liquid fuel into each of said reactors.

References Cited

UNITED STATES PATENTS

| | | | |
|---|---|---|---|
| 3,203,173 | 8/1961 | Madey | 60—203 |
| 3,270,496 | 9/1966 | Rom | 70—203 |

CARLTON R. CROYLE, *Primary Examiner.*